United States Patent [19]

Boon

[11] 4,433,938
[45] Feb. 28, 1984

[54] METHOD AND APPARATUS FOR LOWERING AND POSITIONING A PIPE LINE ONTO THE BOTTOM OF A DEEP WATER

[75] Inventor: Bart Boon, Schiedam, Netherlands

[73] Assignee: Gusto Engineering B.V., Schiedam, Netherlands

[21] Appl. No.: 330,513

[22] Filed: Dec. 14, 1981

[30] Foreign Application Priority Data

Dec. 16, 1980 [NL] Netherlands .................... 8006816

[51] Int. Cl.$^3$ .............................................. F16L 1/04
[52] U.S. Cl. .................................... 405/166; 405/168
[58] Field of Search ............... 405/166, 167, 168, 170, 405/158; 175/27

[56] References Cited

U.S. PATENT DOCUMENTS

| Re. 28,322 | 1/1975 | Mori ........................................ 175/27 |
| 3,438,213 | 4/1969 | Broussard et al. .................. 405/167 |
| 3,585,806 | 8/1969 | Lawrence .......................... 405/166 |
| 3,775,987 | 12/1973 | Rochelle et al. .................... 405/166 |
| 3,893,305 | 7/1975 | Walker ................................ 405/168 |
| 4,264,234 | 4/1981 | Pras .................................... 405/168 |

FOREIGN PATENT DOCUMENTS 2252838 11/1971 Fed. Rep. of Germany ...... 405/158
2455451 6/1975 Fed. Rep. of Germany ...... 405/158
2030480 11/1970 France ................................ 405/158

Primary Examiner—Dennis L. Taylor
Assistant Examiner—John A. Gungor
Attorney, Agent, or Firm—Young & Thompson

[57] ABSTRACT

Method and apparatus for lowering and positioning a pipe line onto the bottom of deep water, the pipe line being assembled from pipe sections on deck of a ship, which pipe line from the bottom of the water extends upwardly according to a curved path (18) followed by a straight portion (17) and finally by a second curved part, the pipe line being held under tension by the ship to maintain the radius of curvature (R) sufficiently large tensioning is performed from the ship directly on the rectilinear part (17) of the pipe line while above the point of engagement of the tensional force the pipe line is subjected to a bending moment only. The apparatus preferably has a rotatable tube (2) in the ship through which the upper part of the pipe line extends vertically upwardly into a derrick (15) for assembling purposes. The ship has below the hull a horizontal outrigger (3) with a travelling crab (4) with cables (16) of tackles (4) running to clamps (5, 6) which in turn can hold the pipe line (17, 18) and further an angle lever system (7, 8) with pipe line guide elements (10) and a bending device (11).

7 Claims, 5 Drawing Figures

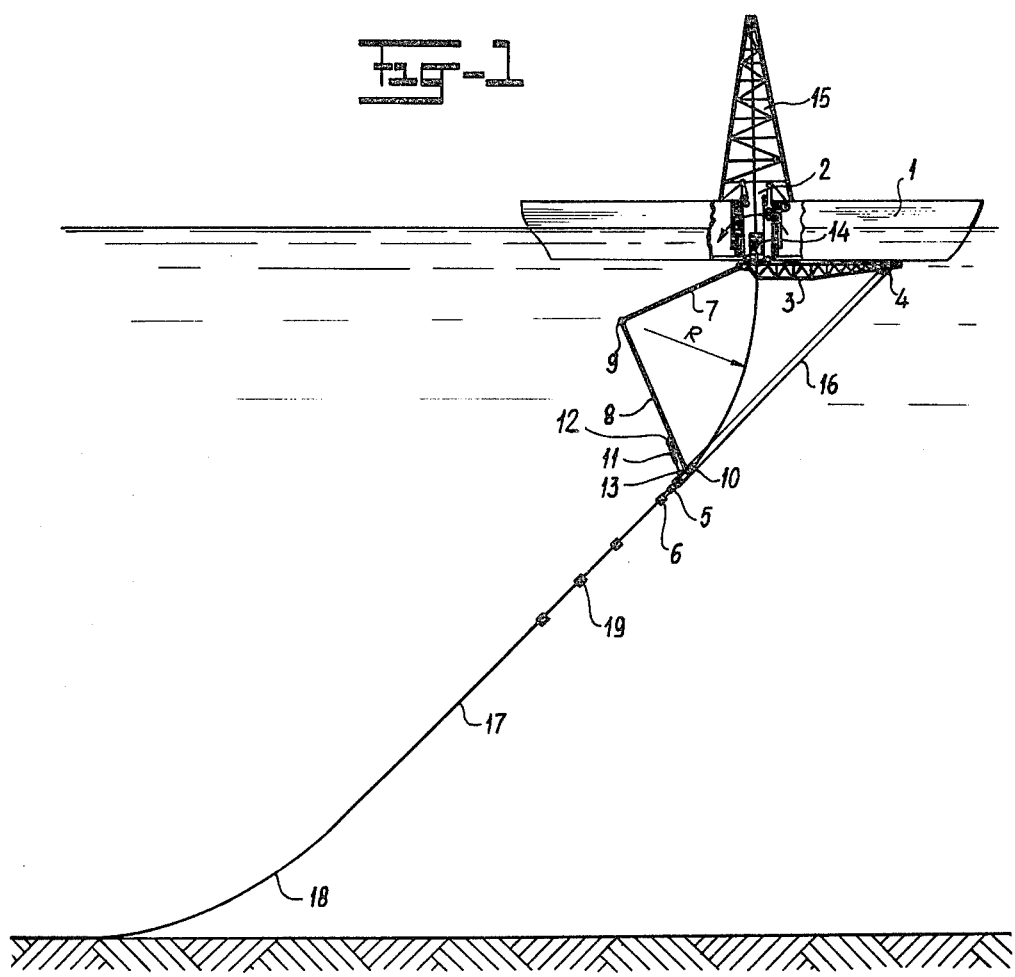

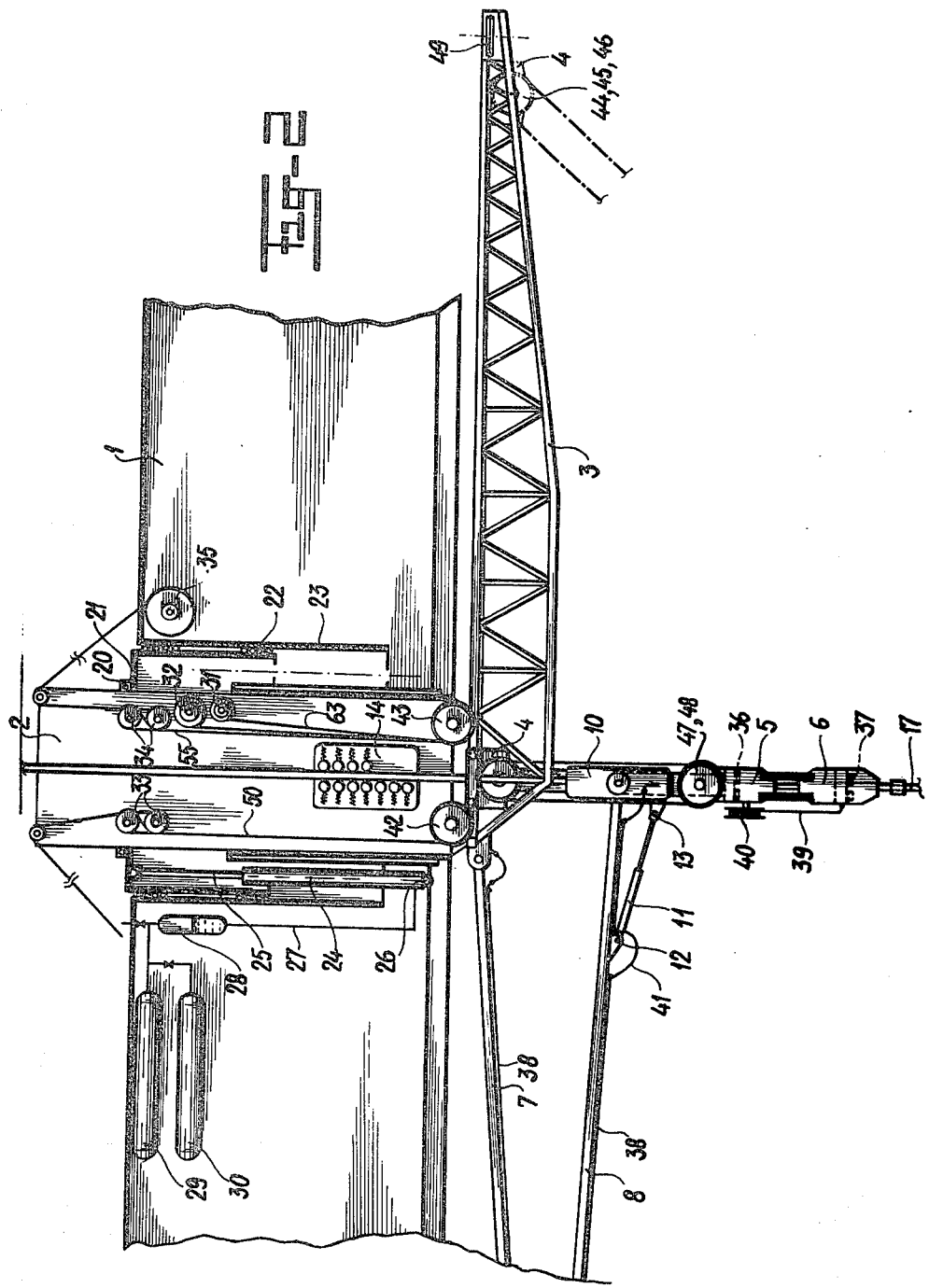

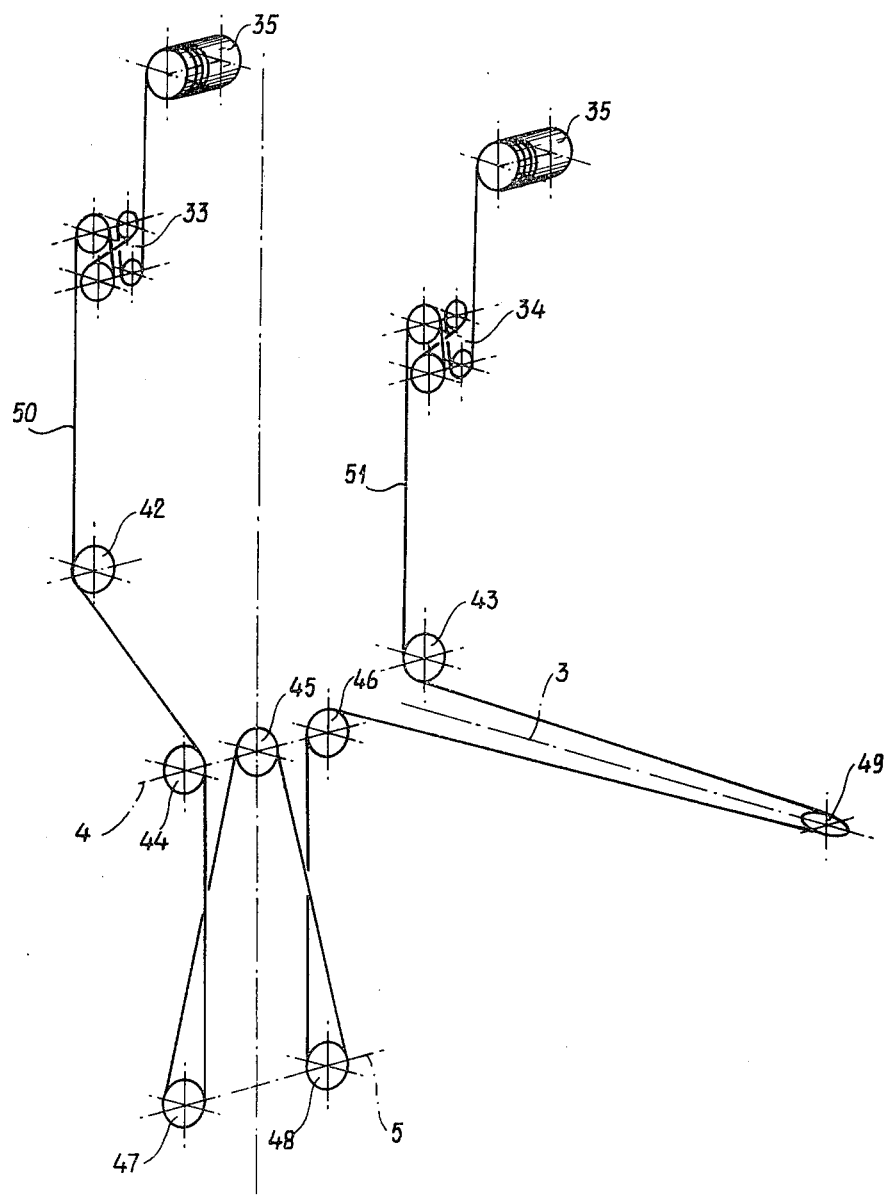

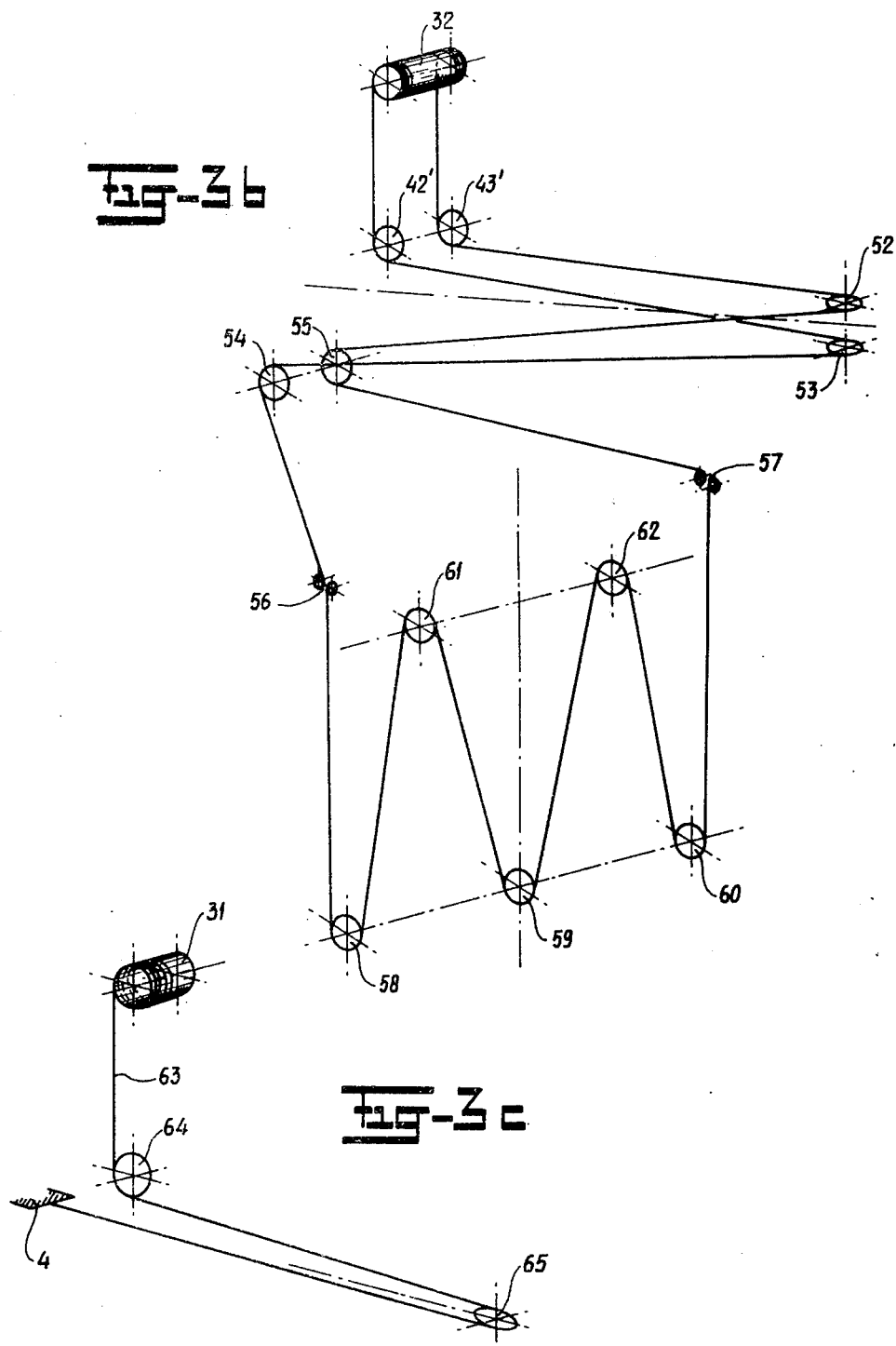

METHOD AND APPARATUS FOR LOWERING AND POSITIONING A PIPE LINE ONTO THE BOTTOM OF A DEEP WATER

The invention relates to a method for lowering and positioning a pipe line onto the bottom of a deep water, which pipe line is assembled from pipe sections on a floating vessel, such as a ship, whereby said pipe line after reaching the bottom extends upwards from the bottom along a curved path to the ship and extends there eventually along a second curved path to that part of the ship where the pipe sections are connected to each other or are connected to the already assembled pipe line, for instance by means of welding, whereby the part of said pipe line running to the bottom is kept under tension to control the curve in said pipe line especially near the bottom.

Such a method is generally known in various embodiments. It is for instance known to assemble a pipe line from pipe sections on the horizontal deck of a ship, whereafter the assembled pipe line is lowered over an outrigger or stinger which extends along the deck in a longitudinal direction whereby the pipe line runs downwards along a curved path and passes into the pipe line part lying upon the bottom via an oppositely directed curved path. To prevent the radius of the curves of this S-shaped pipe line path from becoming too small, which can cause collapse of the pipe line as a result of overload, the whole pipe line part extending along this S-shaped path should be kept under tension to increase the radius of said curves to such a dimension that the material tensions caused by the bending will not result in overload. That means that the ship has to be able to exert strong forces in a horizontal direction, in general through anchors and anchor cables. The consequence thereof is however that the pipe line at the position of said curves is exposed to tensile loads as well as to bending loads. It is also known to guide the pipe line by means of an outrigger in a downwardly sloping direction such that the curve in the upper part is eliminated. However, this does not alter the necessity to exert a strong tensile force on the pipe line and has just as the above mentioned system the disadvantage that the ship must be oriented in the same direction in which the pipe line is laid, which makes adaptions to the wind- and current directions differing from said direction impossible. In great water depths the part of the pipe line suspended from the ship is long and therefore has a heavy weight. This increases the forces which have to be exerted by the ship to keep the pipe line under tension and to restrict the radius of the curve to an acceptable dimension. With increasing depth however the generation of the necessary horizontal tensile component by means of anchoring cables running to said deeper bottom as well, becomes correspondingly more difficult.

The thereby acting forces will lead, especially when also the upper part of the pipe line is curved, very soon to an overload because the material of the pipe line has to absorb not only the tensile force but also the bending force.

The object of the invention is in the first place to provide a method by means of which it is possible to eliminate said overload problem.

Said object according to the invention is reached in that the tension is exerted from the ship directly upon a point of that rectilinear part of the pipe line lying far underneath said ship above the lower curved part, whereby the pipe line part above said point is bent as result of a bending moment exerted thereon. The result thereof is that above the point where the tensile forces are exerted the pipe line is not subjected to a tensile force so that it becomes possible to bend the pipe line into a desired curve using a separate bending device because the material in this pipe line part is then exposed only to material tensions resulting from said bending action. Because of the diversion between the forces acting on the pipe line it is possible to use an upper curve in the pipe line with decreased radius when the pipe is assembled on deck in the horizontal position.

This does not significantly alter the tensile forces to be exerted, especially not in relation to the horizontal tensile force components exerted through the anchors.

According to the invention it is furthermore advantageous when the upper part of the pipe line is bent such that the pipe line extends vertically into the ship. That means that the pipe line is assembled in a vertical plane using a therefor intended derrick, which in principle is of the same type as the derricks used on drilling ships. Because of said vertical assembling method it is possible to position the downwardly sloping rectangular pipe line part under a steeper angle, that means a smaller angle with reference to the vertical direction, so that the vertical component of the tensile forces which have to be exerted on said pipe line is relatively increased and the horizontal component thereof is decreased, whereby the vertical component is created by the buoyancy of the ship. That means that decreased forces have to be exerted in the horizontal direction to create said horizontal component, for instance by means of anchoring cables or by means of the ship's own propulsion means.

Vertically guiding the upper pipe line part into the ship offers furthermore the possibility to carry out the whole assembling process in a device which is rotatable in relation to the ship, so that the ship can be adjusted in view of the current and wind direction. A ship having dynamic positioning means, which are themselves known for instance from drilling ships, can be adapted in a very simple way for pipe line laying purposes in this case.

The invention furthermore provides an apparatus for applying the method according to the invention and said apparatus is especially characterized in that the ship comprises a tube which is in relation to the ship rotatable around a vertical axis and movable in the vertical direction and can be kept in position by means of a swell compensator, which tube carries a horizontal outrigger with a device which is adjustable in the longitudinal outrigger direction and comprises a tensioning device coupled to a clamping system attachable to the pipe line, which tensioning device comprises two cooperating and mutually displaceable clamps destined for alternatively clamping said pipe line, which tube furthermore comprises pipe line guiding elements and a bending device acting on the pipe line between said elements and said clamping system. Because of the displaceability of the device which is movable over the horizontal outrigger it is always possible to keep the tensioning unit aligned with the longitudinal axis of the rectilinear pipe line part. The guiding elements in the tube as well as the guiding elements in the bending device allow further lowering of the pipe line after connecting the next pipe section thereby maintaining the moment necessary for the bending action. For lowering the pipe line said clamping system is used in which one clamp holds the pipe line during the lowering procedure of said pipe line and the other clamp holds the pipe line during the period in which the first mentioned clamp is brought back upwards to its starting position and in which furthermore the next pipe section is connected to the pipe line. The device, which is movable over the outrigger, can consist of a traveling crab having means for moving and locking said crab, which means may comprise in a known way cables connected with a winch.

The tensioning device according to the invention may comprise two sets of tackle with cables, one of which is coupled to one clamp of the clamping system and the other of which is coupled to the other clamp of the clamping system. Each set of tackle controls in turn the tensile force in the pipe line during the period in which the pipe line is held stationary and or is lowered.

The tensioning device according to the invention also can comprise one tackle coupled to the upper clamp of the clamping system, which clamp has means for moving and locking the other clamp relative to said first mentioned clamp. In that case the upper clamp has a mechanism, such as for instance a tackle or a hydraulic device by means of which the lower clamp can be lowered thereby maintaining the tensile force and by means of which said lower clamp can be brought back upwards after the upper clamp has taken over the load.

The clamps can be coupled to the pipe line at the location of enlargements, such as joints, which in general will be positioned where the pipe sections are connected to each other.

The bending device according to the invention can comprise a pipe guide pivotably connected to the lower leg of an angle lever system of which the other leg is connected to said tube and of which said lower leg carries a pressure cylinder coupled to said pipe guide at a point distant from the pivotable connection between said pipe guide and said lower leg.

Such a bending device coupled to an angle lever system, is able to move together with the pipe line according to the curve therein, thereby maintaining the moment applied to the pipe line to determine the correct point, where, dependent onto the slope angle of the rectilinear pipe line part the bending moment should be exerted.

To make possible a correct position determination and dependent thereon if possible an automatic control of the whole system it is useful to install and angular position indicator on the bending device and, when an angle lever system is used, to install also angular position indicators upon the legs of said system. The angular position of each of those parts indicates the angle under which the pipe line runs in relation to the rectilinear part and indicates also the radius of the upper curve. Dependent therefrom the position can be determined of the crab on the horizontal outrigger.

The tube is rotatably supported by bearings in the ship so that said tube can be adjusted as desired. The vertical mobility of said tube in relation to the ship is assured by means of a swell compensator, which implies that the ship is able to move in the vertical direction in relation to said tube. To prevent the movements between the ship and the tube from being transferred to the tensioning device or from having influence on the position of the travelling crab it is according to the invention preferred that the winches of the travelling crab or the winches of the tackle or tackles be positioned in said tube.

The invention will now be explained in more detail with reference to the drawings.

FIG. 1 illustrates schematically in a side view the general arrangement of the apparatus according to the invention.

FIG. 2 illustrates in more detail the apparatus according to the invention.

FIGS. 3, 3a, 3b and 3c show the cable scheme of the tackle and the travelling crab.

FIG. 1 shows a ship 1 in the center of which a tube 2 has been placed, which tube is supported on bearings, rotatable around a vertical axis and movable vertically relative to said ship.

Said tube 2 carries at the under side a horizontal outrigger 3 with a device which is longitudinally movable and adjustable over said outrigger, such as a travelling crab 4 from which cables run to a holding clamp 5. Underneath said clamp a mobile clamp 6 is positioned also by means of cables coupled to said travelling crab 4.

The tube carries furthermore at the side opposite said outrigger an angle lever system comprising the legs 7 and 8. The leg 7 is pivotably connected to the tube 2 and carries at the other end through a pivot joint 9 the leg 8 which is in turn pivotably connected to a pipe guide 10 above the clamp 5. The reference number 11 indicates a hydraulic cylinder of which one end is pivotably coupled to the leg 8 at 12 and the other end of which is at 13 connected to the pipe guide 10.

A vertical pipe guide 14 is positioned within the tube. By exerting a moment on the pipe line by means of the cylinder 11 near the pipe guide 10 by which the pipe line is supported in the guide 14, it is possible to bend the upper pipe line part between the clamp 5 and the guide element 14 according to any arbitrary curve of which the radius is determined by the distance between said bending device and the guide 14.

A derrick 15 is positioned on the ship for connecting pipe sections, which are present on deck of the ship 1, to the already assembled pipe line in the tube 2. The welding and inspection of the welds and also the coating of the pipe line may be carried out inside said derrick.

As appears from FIG. 1, the cables 16 of the tensioning device are aligned with the rectilinear part 17 of the pipe line and the tensile force is exerted on said pipe line through the clamps 5 or 6, so that not only it is assured that the curve 18 has a sufficiently large radius but also the pipe line part above said clamp 5 is not subjected to tensile forces.

The clamps 5 and 6 each in turn can be coupled to the pipe line at the locations of the enlargements 19. When the clamp 6 is activated to be able to lower the pipe line then the clamp 5 opened. After accomplishing the lowering procedure whereby simultaneously the ship is displaced, the clamp 5 is activated again, the tension at that place is restored and taken over by said clamp and thereafter clamp 6 is released and moved upwards towards his starting position. FIG. 2 illustrates the most important part of the apparatus according to the invention on a larger scale, wherein as far as possible the parts also shown in FIG. 1 are indicated by the same reference numbers.

FIG. 2 shows that the tube 2 by means of an axial radial bearing 20 is rotatably supported on a housing 21, which by means of the vertical ball guides 22 is supported vertically displaceably on a cylindrical sleeve 23 which is installed in fixed position in the ship 1. The housing 21 is supported by means of an hydraulic pneumatic swell compensator 24 of which the piston rod 25 acts upon the under side of the housing 21 and of which the cylinder is at 26 supported by the bottom of the ship 1. Said cylinder through a conduit 27 is connected to an accumulator 28 containing the interface between liquid and gas, which accumulator is coupled to a normal air pressure vessel 29 with a pressure of for instance 125 bar. A second pressure vessel is indicated at 30 and has a pressure medium supply of for instance 175 bar by means of which the pressure in the system can be restored in case of pressure loss.

The not in detail illustrated welding station will be positioned approximately at the height of the upper ends of the tube 2 and the inspection of the welding seam can be carried out at a lower level.

In the tube 2 several winches are installed. The winch indicated at 31 is used for the displacement of the tackle 4, which is at the right side in FIG. 1 illustrated in an operative position and in the center of said figure illustrated in a starting position.

The winch of the mobile clamp 6 is indicated at 32. Winches of the Warton-type, of which cables run to the clamp 5, are indicated at 33 and 34. The winch 34 has a cable storage drum 35. A similar drum, however not illustrated, is also used together with the winch 33.

The clamps 5 and 6 comprise the schematically indicated jaws 36, 37 respectively, which are operated hydraulically in a known way. For that purpose a pressure conduit is installed along side the legs 7 and 8 of the angle lever system. Said conduit via not illustrated rotatable couplings is connected to the hose 39 running towards the hydraulically operated control means of the jaws 37 inside the clamp 6, which hose is wound on a hose spooling device which is embodied such that winding and unwinding will be carried out automatically dependent on the displacements of the clamp 6 in relation to the clamp 5.

A conduit 41 may be installed parallel to the conduit 38 for supplying pressure to the hydraulic cylinder 11 of the bending device.

FIG. 2 illustrates the tackle 4 in the position vertically underneath the tube and also displaced completely to the right side.

To explain more clearly the way cables, in which the in FIG. 2 only schematically illustrated, run over the respective sheaves, the cable installation is more clearly outlined in FIGS. 3a, 3b and 3c.

FIG. 3a illustrates how the cables run from the storage drum 35 over the Warton-type winches 33 and 34 and over the guide sheaves 42, 43 at the under side of the tube. The cable guiding sheaves 44, 45 and 46 are installed in the traveling crab 4.

The cable sheaves 47 and 48 are positioned in the upper clamp 5.

The cable sheave 49 is installed at the end of the outrigger 3.

It appears from FIG. 3a that the left cable 50 runs directly by way of the return sheave 42 over the sheaves of the travelling crab 4 and of the clamp 5, whereas the right hand cable 51, which forms together with the left hand cable 50 one uninterrupted cable, runs by way of the return sheave 43 first of all to the return sheave 49 at the end of the outrigger 3. The result thereof is that the traveling crab is balanced in each position of the outrigger 3.

The cables for controlling the mobile clamp 6 run, as is indicated in FIG. 3b, from the winch 32 over the return sheaves 42', 43' which are installed on the same shaft as the sheaves 42 and 43 illustrated in FIGS. 3a and 2. Furthermore they run over the sheaves 52, 53 which are in a similar way as the sheave 49 in FIG. 2 installed at the end of the outrigger 3 and further over the sheaves 54 and 55 installed in the traveling crab and thereafter by way of the sheaves 56, 57 installed in the housing of the clamp 5 towards the sheaves 58, 59, 60 inside the housing of the clamp 6, whereby the cables for load dividing purposes run back over the sheaves 61 and 62 supported in the housing of the clamp 5.

FIG. 3c illustrates the path followed by the cable for controlling the position of the traveling crab 4. Said cable 63 runs from the winch 31 over a sheave 64 carried by the same shaft as the sheaves 43 and 43' and by way of a sheave 65 supported at the end of the outrigger 3 to the schematically indicated traveling crab 4.

Said travelling crab has by its nature the tendency to move under the influence of vertical forces to the inner end of the outrigger 3 so that it is possible to move said traveling crab to the right by means of the winch 31 and the cable 63 to reach such a position that the cables running from said crab are aligned with the rectilinear pipe line part 17 as is illustrated in FIG. 1.

The horizontal outrigger 3 can be attached to the underside of the tube so that said outrigger can be brought into a vertical position whereafter said outrigger can be moved upwards through the tube for maintenance and/or repair.

The same applies to the angle lever system 7, 8 and the parts of the bending device connected thereto and also to the clamps 5 and 6.

In the unoperative position the angle lever system can be brought into the uppermost position so that the whole combination of the angle lever system, the bending device and the outrigger occupies only a very restricted space underneath the ship so that the draught of said ship is not increased in a significant way.

I claim:

1. In a method for lowering and positioning a pipe line onto the bottom of deep water, comprising assembling pipe line from pipe sections upon a floating ship, said pipe line after reaching the bottom extending upwardly from the bottom along a curved path to an upwardly inclined rectilinear part that extends toward the ship; the improvement comprising exerting tension from said ship directly on a point of the rectilinear part of the pipe line from underneath said ship above the lower curved part, whereby the pipe line part above said point is bent as a result of a bending moment exerted thereon, and directing the last-named part such that the pipe line extends vertically into the ship.

2. A method as claimed in claim 1, and exerting said tension in a direction substantially in line with said rectilinear part.

3. In apparatus for lowering and positioning a pipe line onto the bottom of deep water, comprising a floating ship carrying a supply of pipe sections to be connected to the already-assembled pipe line, the pipe line after reaching the bottom extending upwardly from the bottom along a curved path to an upwardly inclined rectilinear part that extends toward the ship; the improvement comprising means for exerting tension from said ship directly on a point of the rectilinear part of the pipe line far underneath said ship above the lower curved part, whereby the pipe line above said point is bent as a result of a bending moment exerted thereon, and means for directing the last-named part such that the pipe line extends vertically into the ship.

4. Apparatus as claimed in claim 3, in which said tension exerting means extends from the ship to said point substantially in line with said rectilinear part.

5. Apparatus as claimed in claim 3, in which said directing means comprises a vertical tube rotatable about a vertical axis relative to the ship and vertically movable relative to the ship.

6. Apparatus as claimed in claim 5, and a horizontal outrigger carried by the lower end of the tube, said tensioning means being carried by said outrigger.

7. Apparatus as claimed in claim 5, and a pipe bending device carried by said tube and operable on said tube to bend the tube so that the tube extends vertically into said ship.

* * * * *